(12) United States Patent
Waki et al.

(10) Patent No.: US 7,381,239 B2
(45) Date of Patent: *Jun. 3, 2008

(54) ALLOY NANO-PARTICLES

(75) Inventors: Koukichi Waki, Minami-ashigara (JP); Genichi Furusawa, Minami-ashigara (JP); Yasushi Hattori, Odawara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 598 days.

This patent is subject to a terminal disclaimer.

(21) Appl. No.: 10/875,772

(22) Filed: Jun. 25, 2004

(65) Prior Publication Data

US 2005/0022628 A1 Feb. 3, 2005

(30) Foreign Application Priority Data

Jun. 25, 2003 (JP) ............................. 2003-181205

(51) Int. Cl.
*H01F 1/20* (2006.01)
(52) U.S. Cl. .................. 75/255; 148/300; 148/306; 148/313; 977/777
(58) Field of Classification Search ............... 148/300, 148/306, 313; 75/255; 977/777
See application file for complete search history.

(56) References Cited

U.S. PATENT DOCUMENTS 6,162,532 A * 12/2000 Black et al. ................ 428/323
6,878,445 B2 * 4/2005 Hattori et al. .............. 428/402
7,053,021 B1 * 5/2006 Zhong et al. ............... 502/185
7,067,199 B2 * 6/2006 Hattori et al. .............. 428/611
7,189,438 B2 * 3/2007 Momose et al. ............ 427/598
2003/0140731 A1 * 7/2003 Bocarsly et al. .............. 75/370
2005/0196606 A1 * 9/2005 Ihara et al. ................. 428/323

FOREIGN PATENT DOCUMENTS

JP 01-162705 6/1989

OTHER PUBLICATIONS

Murray, C.B. et al., "Colloidal synthesis of nanocrystals and nanocrystal superlattices", IBM Journal of Research and Developnment, vol. 45, No. 1, pp. 47-56, Jan. 2001.*

* cited by examiner

*Primary Examiner*—George Wyszomierski
(74) *Attorney, Agent, or Firm*—Buchanan Ingersoll & Rooney PC

(57) ABSTRACT

Disclosed are alloy nano-particles having a fluctuation coefficient of particle size of 20% or less and a fluctuation coefficient of composition of 20% or less. The alloy nano-particles have a low transformation point and hardly aggregate and which can form a flat magnetic film having high coercive force.

11 Claims, No Drawings

ALLOY NANO-PARTICLES

BACKGROUND OF THE INVENTION

1. Technical Field

The present invention relates to alloy nano-particles having high coercive force, more precisely to those which have a low transformation point and hardly aggregate and which can form a flat magnetic film having high coercive force.

2. Background Art

It is important to reduce the particle size of the magnetic matter in a magnetic layer for increasing the magnetic recording density of the layer. For example, in magnetic recording media that are widely used for video tapes, computer tapes, discs and others, ferromagnetic particles having a smaller particle size are better for noise reduction than larger ones having the same mass.

Recently, CuAu-type or $Cu_3Au$-type hard-magnetic ordered alloys have been developed as materials that are hopeful for increasing the magnetic recording density in recoding media. Such CuAu-type and $Cu_3Au$-type alloys all have high magnetocrystalline anisotropy owing to the strain that occurs therein when they are ordered, and they exhibit good hard magnetism even when their particle size is reduced to a level of nano-particles.

Methods for producing nano-particles capable of forming those CuAu-type or $Cu_3Au$-type alloys are known, and based on a mode of precipitation, they are grouped into an alcohol reduction method of using a primary alcohol; a polyol reduction method of using a secondary alcohol, a tertiary alcohol, or a polyalcohol such as diol or triol; a thermal decomposition method; an ultrasonic decomposition method; and a super-reduction method of using a strong reducing agent. Based on a mode of reaction system, the methods are grouped into a polymer-in-site method, a high-boiling-point solvent method, a normal micellation method, and a reversed micellation method.

In the alcohol reduction method, the reducing power of the alcohol used is weak, and therefore the method is problematic in that, when a noble metal and a base metal are simultaneously reduced, core/shell structured particles are often formed and uniform alloys are difficult to produce. The polyol reduction method and the thermal decomposition method indispensably require high-temperature reaction and are therefore problematic in that they lack production latitude in point of the production costs, etc. The ultrasonic decomposition method and the super-reduction method are relatively simple methods, in which, however, aggregates and precipitates are readily formed and therefore monodispersed fine nano-particles are difficult to produce if the reaction system is not specifically designed for producing them.

As a combined system of the alcohol reduction method and the polymer-in-site method, known is an ethanol reduction method to be effected in polyvinylpyrrolidone. In this, however, the polymer amount after the alloy production is extremely large, and therefore the method is problematic in that it is difficult to reduce the polymer amount to the necessary one. As a combined system of the polyol reduction method, the thermal decomposition method and the high-boiling-point solvent method, for example, known are the methods described in JP-A 2000-54012 and U.S. Pat. No. 6,254,662. In these methods, however, highly-toxic substances must be used and they are extremely dangerous, and, in addition, the reaction must be effected in an inert gas at a high temperature of around 300° C. Therefore, these methods are problematic in that the constitution of the apparatus for them is complicated and they lack production latitude. A combined system of the super-reduction method and the polymer-in-site method, and a combined system of the super-reduction method and the reversed micellation method are general methods, for which, however, detailed conditions are not as yet found for obtaining metal nano-particles that have an intended composition and an intended particle size.

The nano-particles produced according to the above-mentioned methods have a face-centered cubic crystal structure. Face-centered cubic crystals are generally soft magnetic or paramagnetic, and they are unsuitable for magnetic recording media. Therefore, for obtaining hard-magnetic ordered alloys that have a coercive force of at least 110 kA/m (1382 Oe) necessary for magnetic recording media, the nano-particles must be annealed at a temperature not lower than the transformation point thereof at which their disordered phase is transformed into an ordered phase.

However, when the nano-particles produced according to the above-mentioned methods are applied onto a support and annealed to fabricate magnetic recording media, they readily aggregate together, and therefore they are problematic in that their coatability is poor and their magnetic properties are not good. In addition, they are still problematic in that, even when they are annealed, their phase could not be completely transformed into an ordered phase and they could not have the intended hard-magnetic property. Further, the transformation point of the nano-particles in the magnetic recoding media is generally at least 500° C. and is high, and ordinary organic supports are not resistant to such high temperatures. To that effect, there is still another problem with the nano-particles in that it is difficult to form a magnetic layer on such an organic support by applying the nano-particles onto it followed by annealing them thereon.

The present invention has been made for solving the above-mentioned problems, and an object of the invention is to provide nano-particles having high coercive force, especially those which have a low transformation point and hardly aggregate and which can form a flat magnetic film.

SUMMARY OF THE INVENTION

To solve the problems as above, we, the present inventors have specifically noted the fluctuation coefficient of the composition of metal particles and the fluctuation coefficient of the particle size of metal particles and have assiduously studied them, and, as a result, have completed the present invention.

Specifically, the object of the invention is attained by alloy nano-particles that are characterized in that both the fluctuation coefficient of the particle size thereof and the fluctuation coefficient of the composition thereof are 20% or less.

The alloy nano-particles of the invention may contain at least two metals selected from Group VIII of the short-form Periodic Table and at least one metal selected from Group I, Group III, Group IV and Group V of the short-form Periodic Table, in which the content of at least one metal selected from Group I, Group III, Group IV and Group V may be from 0 to 35 atomic % of all the alloy nano-particles.

When at least two metals that constitute the alloy are selected from Group VIII, Group I, Group III, Group IV and Group V of the short-form Periodic Table, it is desirable that these metals form a CuAu-type or $Cu_3Au$-type alloy in order that the alloy may exhibit hard magnetism.

The alloy nano-particles include surface-oxidized alloy nano-particles or partly-oxidized alloy nano-particles.

Preferably, the alloy nano-particles of the invention may be produced according to the methods mentioned below.

(1) A method for producing alloy nano-particles, which comprises mixing a reversed micelle solution (I) containing at least one metal compound and a reversed micelle solution (II) containing a reducing agent to reduce the metal compound [reduction step], and ripening the resultant mixture [ripening step].

(2) The method of (1), wherein the metal of the metal compound is at least one metal selected from the group consisting of Group VIII, Group I, Group III, Group IV and Group V.

(3) The method of (1) or (2), wherein the temperature in the reduction step falls between −5 and 30° C.

(4) The method of any of (1) to (3), wherein the temperature in the ripening step falls between 30 and 90° C. and is higher than the reducing temperature.

(5) The method of any of (1) to (4), which includes an annealing step.

(6) The method of (5), wherein the temperature in the annealing step is higher than the transformation point of the alloy that forms the alloy nano-particles.

The alloy nano-particles of the invention are usable in magnetic recording media, and are favorable for magnetic recording media that contain the alloy nano-particles of the invention in at least the magnetic layer thereof.

BEST MODE FOR CARRYING OUT THE INVENTION

The alloy nano-particles of the invention are described in more detail hereinunder. In this description, the numerical range expressed by the wording "a number to another number" means the range that falls between the former number indicating the lowermost limit of the range and the latter number indicating the uppermost limit thereof.

<Alloy Nano-particles of the Invention>

The fluctuation coefficient of the particle size of the alloy nano-particles of the invention and the fluctuation coefficient of the composition of the alloy nano-particles of the invention are at most 20% (e.g. from 1 to 20%). Preferably, the fluctuation coefficient of the particle size and the fluctuation coefficient of the composition are at most 15% (e.g. from 2 to 15%), more preferably at most 10% (e.g. from 2 to 10%). When the fluctuation coefficients are at most 20%, then the fluctuation of the coercive force of the particles is small, and therefore the particles do not so much cause output reduction and noise increase in magnetic recording and reproduction.

For the "fluctuation coefficient of particle size" as referred to herein, the standard deviation of the particle size distribution is obtained in terms of the circle-corresponding diameter of the particles, and this is divided by the mean particle size of the particles, and the resulting value indicates the "fluctuation coefficient of particle size". For the "fluctuation coefficient of composition" as referred to herein, the standard deviation of the composition distribution of the alloy nano-particles is obtained, like that for the fluctuation coefficient of the particle size thereof, and this is divided by the mean composition of the particles, and the resulting value indicates the "fluctuation coefficient of composition". In the invention, the value is multiplied 100 times and is expressed by %.

The fluctuation coefficient of the particle size may be determined as follows: Diluted alloy nano-particles are placed on a carbon film-attached 200-mesh Cu and dried thereon, and a 100,000-magnified negative image thereof taken with TEM (Nippon Denshi's 1200EX) is processed with a particle sizer (Carl Zeiss' KS-300) to determine the arithmetical mean particle size of the particles. The fluctuation coefficient of the particle size may be calculated from the thus-determined data.

On the other hand, the fluctuation coefficient of the composition may be determined as follows: Diluted alloy nano-particles are placed on a carbon film-attached 300-mesh Ni and dried thereon, and while this is observed with FE-TEM (Hitachi's HF-2210) at 500,000 magnifications, the particle composition is analyzed through FE-TEM/EDS (in which the data in the particle region are integrated for 30 seconds, and from the resulting spectrum, the constitutive metal composition is calculated in terms of atomic % according to the Filter Fit process of the built-in software program of EDS), whereby the fluctuation coefficient of the composition may be calculated along with the composition ratio of the particles.

The metals that constitute the alloy nano-particles of the invention are not specifically defined, preferably including at least two metals selected from Group VIII of the short-form Periodic Table and at least one metal selected from Group I, Group III, Group IV and Group V of the short-form Periodic Table.

The secondary or ternary alloys with metals of Group VIII of the short-form Periodic Table include, for example, FePt, FePd, FeNi, FeRh, CoNi, CoPt, CoPd, CoRh, FeNiPt, FeCoPt, CoNiPt, FeCoPd, FeNiPd. The other metals selected from Group I, Group III, Group IV and Group V of the short-form Periodic Table are preferably selected from Cu, Ag, B, In, Sn, Pb, P, Sb and Bi. Preferably, the alloy nano-particles of the invention are of ternary or higher-order alloys. The ternary or higher-order alloys include, for example, FePtCu, FePtIn, FePtPb, FePtBi, FePtAg, CoPtCu, FePdCu, FeCoPtCu, FeNiPtCu, FePtCuAg, FeNiPdCu.

The content of each constitutive metal in the alloy nano-particles of the invention may be suitably determined, depending on the type of the constitutive metals. Preferably, the content of at least one metal selected from Group I, Group III, Group IV and Group V of the short-form Periodic Table is from 0 to 35 atomic %, more preferably from 10 to 35 atomic %, even more preferably from 15 to 30 atomic %. When the metal content is at most 35 atomic %, then the crystal structure of the alloy nano-particles may form an ordered phase with hard magnetism even after annealing treatment.

The transformation point of FePt, CoPt and FePd is at least 550° C. and is generally high. The alloys having such a high transformation point could not be used on polymer supports, and even when used on glass supports, the alloys will have a risk of deforming them. Hard discs having such a deformed support may break a head that runs thereon while floating by at most 10 nm from them for recording and reproduction thereon. Accordingly, it has heretofore been desired to lower the transformation point of alloy nano-particles for use in magnetic recording media.

The alloy nano-particles of the invention may have a transformation point lower than 550° C. In particular, the alloy nano-particles of the invention that contain at least two metals selected from Group VIII of the short-form Periodic Table and at least one metal selected from Group I, Group III, Group IV and Group V of the short-form Periodic Table, in which the content of at least one metal selected from Group I, Group III, Group IV and Group V is from 0 to 35 atomic % of all the alloy nano-particles, may have a lowered transformation point of 400° C. or lower. As a result, when the alloy nano-particles of the invention are used, magnetic recording media of good smoothness may be fabricated and polymer supports may be used for them.

<Method for Producing Alloy Nano-particles>

A method for producing the alloy nano-particles of the invention is described.

The alloy nano-particles of the invention may be produced through a reduction step of mixing a reversed micelle solution (I) that contains at least one metal compound and a reversed micelle solution (II) that contains a reducing agent and reducing the compound, followed by a ripening step of ripening the system after the reduction treatment. The production process gives nano-particles of a multi-component alloy. The steps of the process are described below.

(Reduction Step)

A surfactant-containing, water-insoluble organic solvent is mixed with an aqueous solution containing at least one metal compound to prepare a reversed micelle solution (I). The reversed micelle solution (I) may contain multiple metal salts for forming a multi-component alloy; or different reversed micelle solutions ((I'), (I"), etc.) each containing a different metal salt may be prepared and used as individual reversed micelle solutions. For example, a reversed micelle solution (I) that contains a metal selected from Group VIII is prepared, and apart from it, another reversed micelle solution (I') that contains a metal selected from Group I, Group III, Group IV and Group V is separately prepared, and they may be suitably mixed to prepare a reversed micelle solution.

The surfactant for use herein may be an oil-soluble surfactant. Concretely, it includes sulfonic acid salt-type surfactants (e.g., Aerosol OT (by Wako Jun-yaku)), quaternary ammonium salt-type surfactants (e.g., cetyltrimethylammonium bromide), and ether-type surfactants (e.g., pentaethylene glycol dodecyl ether).

Preferred examples of the water-insoluble organic solvent that dissolves the surfactant are alkanes and ethers. The alkanes are preferably those having from 7 to 12 carbon atoms. Concretely, they are heptane, octane, nonane, decane, undecane, dodecane. On the other hand, the ethers are preferably diethyl ether, dipropyl ether, dibutyl ether.

The amount of the surfactant to be in the water-insoluble organic solvent is preferably from 20 to 200 g/liter.

The metal compound to form the aqueous solution thereof includes metal complex hydroacids having, as the ligand thereof, anitrate, sulfate, hydrochloride, acetate or chloride ion; metal complex potassium salts having a chloride ion as the ligand thereof; metal complex sodium salts having a chloride ion as the ligand thereof, and metal complex ammonium salts having an oxalate ion as the ligand thereof. In the production method of the invention, any of these may be suitably selected and used in any desired manner.

The concentration of the metal compound in its aqueous solution is preferably from 0.1 to 2000 μmol/ml, more preferably from 1 to 500 μmol/ml.

Preferably, a chelating agent is added to the aqueous solution of metal compound in order that the particles formed could have a uniform composition. Concretely, it is desirable that DHEG (dihydroxyethylglycine), IDA (iminodiacetic acid), NTP (nitrilotripropionic acid), HIDA (dihydroxyethyliminodiacetic acid), EDDP (ethylenediaminedipropionic acid dihydrochloride), BAPTA (biaminophenylethylene glycol-tetrapotassium tetraacetate hydrate) or the like is used as a chelating agent. Preferably, the chelate stability constant (logk) is at most 10.

Preferably, the amount of the chelating agent to be added is from 0.1 to 10 mols per mol of the metal compound in the aqueous solution, more preferably from 0.3 to 3 mols.

Next, a reducing agent-containing, reversed micelle solution (II) is prepared. The reversed micelle solution (II) may be prepared by mixing a surfactant-containing, water-insoluble organic solvent and an aqueous solution of a reducing agent. In case where two or more different types of reducing agent is used, then they maybe together mixed to prepare the reversed micelle solution (II). However, in consideration of the solution stability and the processability thereof, it is desirable that the different reducing agents are separately mixed in different water-insoluble organic solvents to prepare different reversed micelle solutions ((II'), (II"), etc.), and these are mixed in a suitable manner before use.

The aqueous solution of reducing agent comprises, for example, any of alcohols, polyalcohols, $H_2$, HCHO, $S_2O_6^{2-}$, $H_2PO_2^-$, $BH_4^-$, $N_2H_5^+$, $H_2PO_3^-$; and water. Preferably, one or more such reducing agents are used therein, either singly or as combined.

Preferably, the amount of the reducing agent in the aqueous solution thereof is from 3 to 50 mols per mol of the metal salt to be reduced with it.

For the surfactant and the water-insoluble organic solvent for the reversed micelle solution (II), the same as those for the reversed micelle solution (I) may be used.

Preferably, the ratio by mass if water to the surfactant (water/surfactant) to be in the reversed micelle solutions (I) and (II) is at most 20. When the mass ratio is at most 20, the system scarcely forms a precipitate and may readily give uniform particles. More preferably, the mass ratio is at most 15, even more preferably from 5 to 10.

The mass ratio of water to the surfactant in the reversed micelle solutions (I) and (II) may be the same or different. Preferably, however, the mass ratio is the same in these in order to form a uniform system.

Thus prepared in the manner as above, the reversed micelle solutions (I) and (II) are mixed. The method of mixing the two is not specifically defined. However, in consideration of the reduction uniformity in the mixed system, it is desirable that the reversed micelle solution (II) is added to the reversed micelle solution (I) while the latter is stirred, and the two are mixed. After the two are mixed, they are subjected to reduction reaction whereupon the temperature of the mixed system is kept constant in the range falling between −5 and 30° C. When the reduction temperature is not lower than −5° C., then the aqueous phase does not condense and the reduction reaction may go on uniformly. When the reduction temperature is not higher than 30° C., then the system scarcely aggregates and precipitates, and it may be stabilized. Preferably, the reduction temperature falls between 0 and 25° C., more preferably between 5 and 25° C.

The "constant temperature" as referred to herein means that, when a preset temperature is T(° C.), then the system temperature falls within a range of T±3° C. Even in this case, the uppermost limit and the lowermost limit of the temperature T shall fall within the above-mentioned range of reduction temperature (between −5 and 30° C.).

The reduction time must be suitably determined depending on the amount of the reversed micelle solutions (I) and (II), but preferably falls between 1 and 30 minutes, more preferably between 5 and 20 minutes.

The reduction reaction has a significant influence on the monodispersibility of the particle size of the alloy formed.

Therefore, it is desirable that the reduction is effected with stirring as rapidly as possible (for example, at about 3000 rpm or more).

Preferably, the stirring device for it has a high shearing force. Precisely, the stirring blade has a turbine-type or paddle-type basic structure, and it is sharply edged or a sharp edge is fitted to its tip, and it is rotated with a motor. Concretely, examples of the stirring device of the type that maybe preferably used in the invention are dissolver (by Tokushu Kikai Kogyo), omnimixer (by Yamato Kagaku), homogenizer (by SMT). Using these devices, it is possible to produce a stable dispersion of monodispersed nano-particles.

After the reaction of the reversed micelle solutions (I) and (II), it is desirable that at least one dispersant having from 1 to 3 amino or carboxyl groups is added to the system in an amount of from 0.001 to 10 mols per mol of the alloy nano-particles to be produced. When the amount of the dispersant is from 0.001 to 10 mols, then the monodispersibility of the alloy nano-particles produced could be improved more, and the particles will not aggregate.

The dispersant is preferably an organic compound that has a group capable of bonding to the surfaces of the alloy nano-particles. Concretely, it has from 1 to 3 such groups. The group includes an amino group, a carboxyl group, a sulfonic acid group and a sulfinic acid group, and one or more of these may be in compound.

Represented by their structure, the compound includes R—$NH_2$, $H_2N$—R—$NH_2$, $H_2N$—R ($NH_2$)—$NH_2$, R—COOH, HOCO—R—COOH, HOCO—R(COOH)—COOH, R—$SO_3H$, $HOSO_2$—R—$SO_3H$, $HOSO_2$—R($SO_3H$)—$SO_3H$, R—$SO_2H$, HOSO—R—$SO_2H$, HOSO—R($SO_2H$)—$SO_2H$. In these formulae, R represents a linear, branched or cyclic, saturated or unsaturated hydrocarbon residue.

The compound that is especially preferred for the dispersant is oleic acid. Oleic acid is well known as a surfactant for colloid stabilization, and has heretofore been used for protecting iron nano-particles. The relatively long chain of oleic acid gives steric hindrance that is important for canceling the strong magnetic interaction between particles (oleic acid has a chain of 18 carbon atoms, and its length is 2 nm or so (20 angstroms or so), and it has one double bond). Oleic acid i s an inexpensive natural resource that may be readily obtained, for example, from olive oil, and it is favorable for use in the invention. In addition oleylamine derived from oleic acid is also a useful dispersant, like oleic acid.

Further, other long-chain carboxylic acids similar to the above, such as erucic acid and linolic acid are also usable like oleic acid (for example, long-chain organic acids having from 8 to 22 carbon atoms may be used either singly or as combined).

The time for dispersant addition is not specifically defined. Preferably, it may be added within a period of time just after the reduction and before the start of the ripening step mentioned below. Adding the dispersant makes it possible to produce more monodispersed and more non-aggregating alloy nano-particles.

(Ripening Step)

In the production method of the invention, the reduction is followed by a ripening step of heating the reaction solution up to a ripening temperature thereof.

In the ripening step, the system is preferably kept at a constant temperature falling between 30 and 90° C., and it is suitable that the ripening temperature is higher than the reduction temperature as above. Also preferably, the ripening time falls between 5 and 180 minutes. When the ripening temperature and the ripening time falls within the range as above, then the system scarcely aggregates or precipitates and the reaction may be completed to give a constant composition. More preferably, the ripening temperature and the ripening time are between 40 and 80° C. and between 10 and 150minutes, more preferably between 40 and 70° C. and between 20 and 120 minutes.

The "constant temperature" as referred to herein for the ripening step has the same meaning as that mentioned hereinabove for the reduction step (however, the constant temperature in the ripening step is for ripening temperature and not for reduction temperature). Especially preferably, the ripening temperature is higher by at least BOC than the reduction temperature, falling within the range of the ripening temperature as above (30 to 90° C.); even more preferably, it is higher by at least 10° C. than the latter. When the ripening temperature is higher by at least 5° C. than the reduction temperature, then the alloy produced may surely have a predetermined composition.

In the ripening step as above, a noble metal deposits on the base metal having deposited through reduction precipitation in the reducing step. Specifically, noble metal reduction occurs only on the base metal, or that is, base metal and noble metal do not separately deposit. Accordingly, nano-particles capable of forming a CuAu-type or $Cu_3Au$-type hard-magnetic ordered alloy and having a desired composition can be produced efficiently at a high yield. In addition, when the stirring speed at the ripening temperature is suitably controlled, then alloy nano-particles having a desired particle size can be produced.

Preferably, the ripening step is followed by a washing and dispersing step, as follows: The ripened system is washed with a mixed solution of water and a primary alcohol, then this is processed for precipitation with a primary alcohol to give a precipitate, and the precipitate is dispersed in an organic solvent. In the washing and dispersing step, impurities may be removed, and the coatability of the particle dispersion in forming a magnetic layer of magnetic recording media may be further improved.

The washing and dispersion are effected at least once each, but preferably at least twice each.

The primary alcohol to be used for the washing is not specifically defined, but is preferably methanol or ethanol. The blend ratio by volume of water to primary alcohol (water/primary alcohol) preferably falls between 10/1 and 2/1, more preferably between5/1 and 3/1. If the proportion of water is too large, then the surfactant could not be removed; but on the contrary, if the proportion of primary alcohol is too high, then the system may aggregate.

In the manner as above, alloy nano-particles dispersed in a solution are obtained. Since the alloy nano-particles are monodispersed, they do not aggregate but may keep the uniformly dispersed condition thereof even when applied to supports. Accordingly, even when the alloy nano-particles are annealed, they do not aggregate. Therefore, they could be efficiently hard-magnetized, and their coatability is good.

In the invention, the particle size of the alloy nano-particles is preferably from 1 to 20 nm before annealed, more preferably from 3 to 10 nm. When used in magnetic recording media, it is desirable that the alloy nano-particles are made to have a closest-packed structure in order to increase the recording capacity of the media.

If the particle size of the alloy nano-particles is too small, it is undesirable since they would be ultra-paramagnetic owing to the thermal fluctuation thereof. The smallest stable particle size may vary, depending the constitutive elements of the particles. In order to make the particles have the necessary particle size, it will be effective that the mass ratio of $H_2O$/surfactant is varied in producing the particles.

For determining the particle size of the produced alloy nano-particles of the invention, a transmission electronic microscope (TEM) may be used. For determining the crystal system of the alloy nano-particles that have become hard magnetic after heating, they may be analyzed through electron ray diffractiometry with TEM, but X-ray diffractiometry is more preferred for more accurately analyzing them. For composition analysis of the inner depth of the hard-magnetic alloy nano-particles, FE-TEM/EDS is preferred as it enables to thin electron rays as much as possible. The magnetic properties of the hard-magnetic nano-particles may be determined with VSM.

After annealed as in the manner mentioned below, the alloy nano-particles preferably have a coercive force (Hc) of from 110 to 1200 kA/m (from 1382 to 15079 Oe), more preferably from 160 to 800 kA/m (from 2010 to 10052 Oe).

The method of heating the alloy nano-particles at a temperature not lower than the transformation point there of (for annealing treatment) is not specifically defined. Preferably, the alloy nano-particles are heated after applied onto a support, in order to prevent them from fusing together.

Since the alloy nano-particles of the invention have a low transformation point, they may be favorably applied to organic supports having a low heat-resisting temperature. In this case, for example, pulse laser may be used as the means of heating the particles at their transformation point. Pulse laser is effective, not causing thermal deterioration or deformation of organic supports.

The alloy nano-particles of the invention are favorably used in video tapes, computer tapes, flexible discs, hard discs, etc. They are also favorably used in MRAMs.

<Magnetic Recording Medium>

Magnetic recording media with the alloy nano-particles of the invention are described below.

The magnetic recording medium with the alloy nano-particles of the invention has, on a support thereof, at least a magnetic layer that contains the alloy nano-particles of the invention, and optionally has any other layer. The magnetic layer may be formed by applying a coating liquid with the alloy nano-particles of the invention dispersed therein onto a support followed by annealing it.

Specifically, the magnetic recording medium with the alloy nano-particles of the invention has, on the surface of a support thereof, a magnetic layer that contains the alloy nano-particles of the invention, and optionally has a non-magnetic layer formed between the magnetic layer and the support; and in discs, a magnetic layer is formed also on the back of the support, and optionally a magnetic layer and a non-magnetic layer are formed thereon. In tapes, a back coat layer is formed on the side of the support opposite to the magnetic layer.

A method for fabricating magnetic recording media where the alloy nano-particles of the invention are favorably used is described below, and with reference to the fabrication method, the magnetic recording media that comprise the alloy nano-particles of the invention are described in detail.

For the coating liquid with the alloy nano-particles of the invention dispersed therein, employable is the solution that contains the alloy nano-particles of the invention. In practice, it is desirable that some known additives and various solvents are added to the alloy nano-particles-containing coating liquid to thereby control the content of the alloy nano-particles in the resulting liquid to a predetermined one (for example, from 0.01 to 0.1 mg/ml).

The coating liquid is applied onto a support to form thereon an undercoating liquid or a magnetic layer. For fabricating the magnetic recording medium that comprises the alloy nano-particles of the invention, for example, the coating liquid is applied to the surface of a support, preferably in such a manner that the dry thickness of the magnetic layer formed could be from 5 to 200 nm, more preferably from 5 to 100 nm. Multiple coating liquids may be applied onto a support successively or simultaneously to form multiple layers thereon.

For applying the coating liquid onto the support, for example, employable is any method of air doctor coating, blade coating, rod coating, extrusion coating, air knife coating, squeeze coating, dipping, reverse roll coating, transfer roll coating, gravure coating, kiss coating, casting, spraying, spin coating, etc. Above all, preferred is spin coating, blade coating or dipping.

The support for the magnetic recording medium may be any of inorganic substances or organic substances. For the inorganic support, for example, usable are Al, Al—Mg alloy, other Mg alloy such as Mg—Al—Zn, as well as glass, quartz, carbon, silicon, ceramics. These supports are resistant to impact. As rigid, in addition, they may be formed thin and are suitable to high-speed rotation. As compared with organic supports, the inorganic supports are characterized in that they are stable to heat.

For the organic support, for example, usable are polyesters such as polyethylene terephthalate, polyethylene naphthalate; polyolefins; as well as cellulose triacetate, polycarbonates, polyamides (including aliphatic polyamides and aromatic polyamides such as aramide), polyimides, polyamidimides, polysulfones, polybenzoxazoles.

Before annealed, the alloy nano-particles of the invention have a disordered phase. Therefore, in order to make them hard-magnetic, they must be annealed so as to make them have an ordered phase. For annealing the alloy nano-particles, it is desirable that the particles are applied onto a support and then heated thereon in order to prevent them from being fused together. Regarding the heating temperature for the annealing treatment, the ordered-disordered phase transformation point of the alloy that constitutes the alloy nano-particles is determined through differential thermal analysis (DTA), and the particles must be heated at a temperature higher than the thus-determined transformation point.

When an organic support is used, the above-mentioned method of heating the magnetic layer alone with a pulse laser is effective for annealing the alloy nano-particles on the support. For the pulse laser, the laser wavelength may fall within a range of UV to IR region. However, since the light absorption by organic supports is in UV region, the laser for them is preferably a visible-ray to IR-ray laser.

Since the coating film is heated within a short period of time with it, the pulse laser output is preferably 0.1 W or more, more preferably 0.3 W or more. If the output is too high, the organic supports may be influenced by the laser heat. Therefore, the output is preferably at most 3 W.

In view of the laser wavelength and the laser output thereof, preferred pulse lasers for use herein are Ar ion laser, Cu vapor laser, HF chemical laser, dye laser, ruby laser, YAG laser, glass laser, titanium-sapphire laser, alexandrite laser, GaAlAs array semiconductor laser.

The linear speed in scanning the laser ray is preferably from 1 to 10 m/sec, more preferably from 2 to 5 m/sec, for sufficient annealing with no ablation.

In the magnetic recording media, an extremely thin protective layer maybe formed on the magnetic layer for improving the abrasion resistance of the coating layer, and a lubricant may be applied on it for improving the lubricity of the media, Thus designed, the magnetic recording media may have good reliability.

The protective layer may be formed of an oxide such as silica, alumina, titania, zirconia, cobalt oxide, nickel oxide; a nitride such as titanium nitride, silicon nitride, boron nitride; a carbide such as silicon carbide, chromium carbide, boron carbide; or carbon such as graphite, amorphous carbon. Preferably, the protective layer is a carbon protective layer formed of carbon. More preferably, the carbon protective layer is formed of hard amorphous carbon that is generally referred to as diamond-like carbon.

In general, the carbon protective layer is formed in a mode of sputtering on hard discs. However, a lot of different methods of plasma CVD to be attained at a higher film-forming speed have been proposed for other products such as video tapes on which the layer must be formed continuously. In particular, it is said that plasma-injection CVD (PI-CVD) is attained at an extremely high film-forming speed and gives hard and good protective films with few pin holes (e.g., JP-A 61-130487, 63-279426, 3-113824).

The carbon protective layer is of a hard carbon film having a Vickers hardness of at least 1000 kg/mm$^2$, preferably at least 2000 kg/mm$^2$. Its crystal structure is an amorphous structure, and it is non-conductive. When the carbon protective layer is formed of a diamond-like carbon film and when its structure is analyzed through Raman spectrometry, the layer gives a peak at 1520 to 1560 m$^{-1}$ and it confirms the structure of the layer. If the layer structure is shifted from the diamond-like structure, then the peak detected in Raman spectrometry of the layer is shifted from the above-mentioned range and the film hardness lowers.

The material for forming the carbon protective layer may be a carbon-containing compound that includes, for example, alkanes such as methane, ethane, propane, butane; alkenes such as ethylene, propylene; alkynes such as acetylene. If desired, a carrier gas such as argon or any other additive gas such as hydrogen or nitrogen may be added to the film-forming system for improving the quality of the layer formed.

If the carbon protective layer is too thick, then it may lower the electro-magnetic conversion characteristic of the underlying magnetic layer or its adhesiveness to the magnetic layer may lower; but if too thin, then its abrasion resistance will be poor. Accordingly, the thickness of the carbon protective layer is preferably from 2.5 to 20 mm, more preferably from 5 to 10 nm. For improving the adhesiveness of the carbon protective layer to the thin film of ferromagnetic metal that serves as a support thereof, the surface of the thin ferromagnetic metal film may be previously etched with an inert gas, or may be modified by exposing it to reactive gas plasma such as oxygen plasma.

The magnetic layer may have a multi-layered structure for improving the electromagnetic conversion characteristic thereof. In addition, a non-magnetic subbing layer or an interlayer may be formed in addition to it.

In order to improve the running durability and the corrosion resistance of the magnetic recording media that comprise the alloy nano-particles of the invention, it is desirable that a lubricant or an anticorrosive agent is applied to the magnetic layer or the protective layer. The lubricant to be added thereto include known hydrocarbon-type lubricants, fluorine-containing lubricants, and extreme-pressure additives.

Examples of the hydrocarbon-type lubricants are carboxylic acids such as stearic acid, oleic acid; esters such as butyl stearate; sulfonic acids such as octadecyl sulfonic acid; phosphates such as monooctadecyl phosphate; alcohols such as stearyl alcohol, oleyl alcohol; carbonamides such as stearamide; and amines such as stearylamine.

The fluorine-containing lubricants are, for example, those prepared by partially or completely substituting the alkyl group in the hydrocarbon-type lubricants with a fluoroalkyl or perfluoropolyether group.

The perfluoropolyether group includes perfluoromethyleneoxide polymer, perfluoroethyleneoxide polymer, perfluoro-n-propyleneoxide polymer $(CF_2CF_2CF2O)_n$, perfluoroisopropyleneoxide polymer $(CF(CF_3)CF_2O)_n$, and their copolymers. Compounds having a polar functional group such as hydroxyl group, ester group or carboxyl group at the end or inside the molecule thereof are preferred for use herein as their effect of reducing frictional force is high. Preferably, the molecular weight of the compounds is from 500 to 5000, more preferably from 1000 to 3000. The compounds having a molecular weight at least 500 are good since they are not volatile and their lubricity does not lower. On the other hands, the compounds having a molecular weight at most 5000 are also good, since their viscosity is in a favorable range and they are effective for preventing slider-to-disc sticking and for preventing disc running failure or head crush.

Examples of the perfluoropolyether-substituted lubricant are Ausimont's trade name FOMBLIN, and DuPont's trade name KRYTOX.

The extreme-pressure additives include phosphates such as trilauryl phosphate; phosphite such as trilauryl phosphite; thiophosphites and thiophosphates such as trilauryl trithiophosphite; and sulfur-containing extreme-pressure agents such as dibenzyl disulfide.

One or more of the above-mentioned lubricants may be used herein either singly or as combined. The method for applying the lubricant to the magnetic layer or the protective layer comprises dissolving the lubricant in an organic solvent and applying the resulting solution to it in a mode of wire bar coating, gravure coating, spin coating or dipping, or the lubricant may be applied to it in a mode of vacuum evaporation.

The anticorrosive agent includes nitrogen-containing heterocyclic compounds such as benzotriazole, benzimidazole, purine, pyrimidine; their derivatives prepared by introducing an alkyl side chain to the mother nucleus thereof; nitrogen and sulfur-containing heterocyclic compounds such as benzothiazole, 2-mercaptobenzothiazole, tetrazaindene cyclic compounds, thiouracil compounds, and their derivatives.

When a back coat layer (backing layer) is formed on the side of the support not coated with the magnetic layer, it may be formed as follows: Granular components such as an abrasive and an antistatic agent are dispersed in an organic solvent along with a binder therein to prepare a coating liquid for the back coat layer, and this is applied on the other surface of the support not coated with the magnetic layer, thereby forming thereon the intended back coat layer.

For the granular components, usable are various inorganic pigments and carbon black. For the binder, usable are nitrocellulose and resins such as phenoxy resin, polyvinyl chloride resin, polyurethane one or more of these may be used either singly or as combined.

If desired, an adhesive layer may be formed on the surface of the support to be coated with the dispersion of the nano-particles of the invention and on the surface thereof to be coated with the back coat layer.

In order that the magnetic recording media mentioned above are those for high-density recording, it is desirable that they have an extremely flattened surface to such a degree that the center line mean roughness of the surface is from 0.1 to 5 nm, more preferably from 1 to 4 nm at a cut-off value of 0.25 mm. For making them have such a surface, they are preferably calendered after the magnetic layer has been formed. If desired, they may be burnished.

The magnetic recording media obtained here in may be blanked with a blanking machine or may be cut with a cutter into desired sizes for practical use.

The characteristics of the invention are described more concretely with reference to the following Examples and Comparative Examples. The materials, their amount and ratio, the details of the treatment and the process of the treatment may be suitably varied and modified, not overstepping the sprit and the scope of the invention. Accordingly, the invention should not be limited by the following Examples.

EXAMPLE 1

The following operation was carried out in high-purity $N_2$ gas.

0.35 g of triammonium trioxalate/iron $(Fe(NH_4)_3(C_2O_4)_3)$ (from Wako Jun-yaku) and 0.35 g of potassium chloroaurate $(K_2PtCl_4)$ (from Wako Jun-yaku) were dissolved in 24 ml of $H_2O$ (deoxygenated) to prepare an aqueous metal salt solution, and an alkane solution prepared by adding 10.8 g of Aerosol OT to 80 ml of decane was added to and mixed with it to prepare a reversed micelle solution (I).

0.57 g of $NaBH_4$ (from Wako Jun-yaku) was dissolved in 12 ml of $H_2O$ (deoxygenated) to prepare an aqueous reducing agent solution, and an alkane solution prepared by adding 5.4 g of Aerosol OT (from Wako Jun-yaku) to 40 ml of decane (from Wako Jun-yaku) was added to and mixed with it to prepare a reversed micelle solution (II).

While the reversed micelle solution (I) was stirred at high speed with an omnimixer (from Yamato Kagaku) at 22° C., the reversed micelle solution (II) was instantly added to it. Five minutes after the addition, this was stirred with a magnetic stirrer and heated up to 40° C., and then ripened for 120 minutes. After this was cooled to room temperature, 2 ml of oleic acid (from Wako Jun-yaku) was added to and mixed with it, and then this was taken out in air. To break the reversed micelles in the mixture, a mixed solution of 200 ml of $H_2O$ and 200 ml of methanol was added to it, and this was separated into an aqueous phase and an oily phase. The oily phase contained metal nano-particles dispersed therein. The oily phase was washed five times with $H_2O$ 600 ml +methanol 200 ml. Next, 1300 ml of methanol was added to it for flocculation and precipitation of alloy nano-particles therein. The supernatant was removed, and 20 ml of heptane (from Wako Jun-yaku) was added to the residue and the residue was again dispersed therein. Then, 100 ml of water was added to it for precipitation. This operation was repeated twice, and 5 ml of octane (from Wako Jun-yaku) was finally added to it to obtain a dispersion of FePt nano-particles having the particle size and the composition as in Table 1.

EXAMPLE 2

The following operation was carried out in high-purity $N_2$ gas.

0.35 g of triammonium trioxalate/iron $(Fe(NH_4)_3(C_2O_4)_3)$ (from Wako Jun-yaku) and 0.35 g of potassium chloroaurate $(K_2PtCl_4)$ (from Wako Jun-yaku) were dissolved in 24 ml of $H_2O$ (deoxygenated) to prepare an aqueous metal salt solution, and an alkane solution prepared by adding 10.8 g of Aerosol OT to 80 ml of decane was added to and mixed with it to prepare a reversed micelle solution (I).

0.57 g of $NaBH_4$ (from Wako Jun-yaku) was dissolved in 12 ml of $H_2O$ (deoxygenated) to prepare an aqueous reducing agent solution, and an alkane solution prepared by adding 5.4 g of Aerosol OT (from Wako Jun-yaku) to 40 ml of decane (from Wako Jun-yaku) was added to and mixed with it to prepare a reversed micelle solution (II).

0.07 g of copper chloride $(CuCl_2.6H_2O)$ (from Wako Jun-yaku) was dissolved in 2 ml of $H_2O$ (deoxygenated) to prepare an aqueous metal salt solution, and an alkane solution prepared by adding 2.7 g of Aerosol OT to 20 ml of decane was added to and mixed with it to prepare a reversed micelle solution (I').

0.88 g of ascorbic acid (from Wako Jun-yaku) and 0.33 g of a chelating agent (DHEG) were dissolved in 12 ml of $H_2O$ (deoxygenated) to prepare an aqueous solution, and an alkane solution prepared by adding 5.4 g of Aerosol OT (from Wako Jun-yaku) and 2 ml of oleylamine (from Tokyo Kasei) to 40 ml of decane (from Wako Jun-yaku) was added to and mixed with it to prepare a reversed micelle solution (II').

While the reversed micelle solution (I) was stirred at high speed with an omnimixer (from Yamato Kagaku) at 22° C., the reversed micelle solution (II) was instantly added to it. After 3 minutes, the reversed micelle solution (I') was added to it at a rate of about 2.4 ml/min, taking about 10 minutes. Five minutes after the addition, this was stirred with a magnetic stirrer and heated up to 40° C. Then, the reversed micelle solution (III) was added to it, and ripened for 120 minutes.

This was washed and purified in the same manner as in Example 1 to obtain a dispersion of FeCuPt nano-particles having the particle size and the composition as in Table 1.

EXAMPLE 3

In the process of Example 2, the metal salt in the reversed micelle solution (I') was changed to 0.07 g of $InCl_3$ (from Wako Jun-yaku), and the reaction mixture was washed and purified in the same manner as in Example 1 to obtain a dispersion of FeInPt nano-particles having the particle size and the composition as in Table 1.

EXAMPLE 4

In the process of Example 2, the metal salt in the reversed micelle solution (I') was changed to 0.08 g of $PbCl_3$ (from Wako Jun-yaku), and the reaction mixture was washed and purified in the same manner as in Example 1 to obtain a dispersion of FePbPt nano-particles having the particle size and the composition as in Table 1.

EXAMPLE 5

In the process of Example 2, the metal salts in the reversed micelle solutions (I) and (I') were changed to the following, and the reaction mixture was washed and purified in the same manner as in Example 1 to obtain a dispersion of CoBiPt nano-particles having the particle size and the composition as in Table 1.

Metal salts in reversed micelle solution (I):
  0.20 g of cobalt chloride $(CoCl_2.6H_2O)$, and 0.35 g of potassium chloroaurate $(K_2PtCl_4)$ (from Wako Jun-yaku).

Metal salt in reversed micelle solution (I'):
0.41 g of bismuth nitrate ($Bi(NO_3)_3 \cdot 5H_2O$).

EXAMPLE 6

The following operation was carried out in high-purity $N_2$ gas.

0.18 g of triammonium trioxalate/iron ($Fe(NH_4)_3(C_2O_4)_3$) (from Wako Jun-yaku) and 0.35 g of potassium chloroaurate ($K_2PtCl_4$) (from Wako Jun-yaku) were dissolved in 24 ml of $H_2O$ (deoxygenated) to prepare an aqueous metal salt solution, and an alkane solution prepared by adding 10.8 g of Aerosol OT to 80 ml of decane was added to and mixed with it to prepare a reversed micelle solution (I).

0.10 g of cobalt chloride ($CoCl_2 \cdot 6H_2O$) (from Wako Jun-yaku) was dissolved in 2 ml of $H_2O$ (deoxygerated) to prepare an aqueous metal salt solution, and an alkane solution prepared by adding 2.7 g of Aerosol OT to 20 ml of decane was added to and mixed with it to prepare a reversed micelle solution (I').

0.57 g of $NaBH_4$ (from Wako Jun-yaku) was dissolved in 12 ml of $H_2O$ (deoxygenated) to prepare an aqueous reducing agent solution, and an alkane solution prepared by adding 5.4 g of Aerosol OT (from Wako Jun-yaku) to 40 ml of decane (from Wako Jun-yaku) was added to and mixed with it to prepare a reversed micelle solution (II).

0.06 g of copper acetate ($Cu(CH_3COO)_2 \cdot H_2O$) (from Wako Jun-yaku) was dissolved in 2 ml of $H_2O$ (deoxygenated) to prepare an aqueous metal salt solution, and an alkane solution prepared by adding 2.7 g of Aerosol OT to 20 ml of decane was added to and mixed with it to prepare a reversed micelle solution (I'').

0.88 g of ascorbic acid (from Wako Jun-yaku) and 0.33 g of a chelating agent (DHEG) were dissolved in 12 ml of $H_2O$ (deoxygenated) to prepare an aqueous solution, and an alkane solution prepared by adding 5.4 g of Aerosol OT (from Wako Jun-yaku) and 2 ml of oleylamine (from Tokyo Kasei) to 40 ml of decane (from Wako Jun-yaku) was added to and mixed with it to prepare a reversed micelle solution (II').

While the reversed micelle solution (I) was stirred at high speed with an omnimixer (from Yamato Kagaku) at 22° C., the reversed micelle solution (I') was instantly added to it. After 2 minutes, the reversed micelle solution (II) was added to it also instantly. After further 3 minutes, the reversed micelle solution (I'') was added to it at a rate of about 2.4 ml/min, taking about 10 minutes. Five minutes after the addition, this was stirred with a magnetic stirrer, and the reversed micelle solution (II') was added to it then, this was heated up to 40° C. and ripened for 120 minutes.

This was washed and purified in the same manner as in Example 1 to obtain a dispersion of FeCoCuPt nano-particles having the particle size and the composition as in Table 1.

EXAMPLE 7

In the process of Example 6, the metal salt in the reversed micelle solution (I') was changed to 0.07 g of $InCl_3$ (from Wako Jun-yaku), and the reaction mixture was washed and purified in the same manner as in Example 1 to obtain a dispersion of FeCoInPt nano-particles having the particle size and the composition as in Table 1.

COMPARATIVE EXAMPLE 1

A dispersion of FePt nano-particles having the particle size and the composition as in Table 1 was obtained in the same manner as in Example 1, except for the following points: While the reversed micelle solution (I) was stirred with a magnetic stirrer at room temperature (25° C.), the reversed micelle solution (II) was instantly added to it and subjected to reduction, and then ripened at the temperature for 120 minutes.

COMPARATIVE EXAMPLE 2

The following operation was carried out in high-purity $N_2$ gas.

0.39 g of platinum acetylacetonate ($Pt(acac)_2$) (from Wako Jun-yaku), 0.25 g of iron acetylacetonate ($Fe(acac)_3$) and 0.2 g of polyvinylpyrrolidone (molecular weight, 10,000) were dissolved in ethanol 25 ml+$H_2O$ 25 ml to prepare a solution (I), and a solution (II) prepared by dissolving 0.57 g of $NaBH_4$ (from Wako Jun-yaku) in ethanol 25 ml+$H_2O$ 25 ml was added to it and stirred with a magnetic stirrer at room temperature (25° C.) for 30 minutes.

With ethanol being added thereto, the reaction solution was ultrafiltered to remove the side-product salts. Finally, this was concentrated to an ethanol concentration of 5 ml, and a dispersion of FePt nano-particles having the particle size and the composition as in Table 1 was obtained.

COMPARATIVE EXAMPLE 3

The following operation was carried out in high-purity $N_2$ gas.

0.39 g of platinum acetylacetonate ($Pt(acac)_2$) (from Wako Jun-yaku), 0.6 ml of 1,12-dodecanediol (from Wako Jun-yaku), and 20 ml of dioctyl ether were mixed, and heated up to 100° C. Next, 0.28 ml of oleic acid, 0.26 ml of oleylamine and 0.25 g of iron acetylacetonate ($Fe(acac)_3$) were added to it and heated up to 297° C., and then refluxed for 30 minutes.

After this was cooled, 200 ml of methanol was added to it for flocculation and precipitation of metal nano-particles. The supernatant was removed, and the residue was again dispersed in 20 ml of heptane added thereto. Then, 100 ml of methanol was again added to it for precipitation. The heptane dispersion and methanol precipitation was repeated once again, and then the resulting residue was dispersed in 5 ml of octane to obtain a dispersion of FePt nano-particles having the particle size and the composition as in Table 1.

COMPARATIVE EXAMPLE 4

A dispersion of Feat nano-particles having the particle size and the composition as in Table 1 was obtained in the same manner as in Comparative Example 2, except that the system was stirred at high speed with an omnimixer (from Yamato Kagaku) and not with the magnetic stirrer.

<Determination of Fluctuation Coefficient of Particle Size and Fluctuation Coefficient of Composition of Alloy Nano-particles>

The alloy nano-particles obtained in Examples 1 to 7 and Comparative Examples 1 to 4 were analyzed to determine and calculate the composition ratio, the fluctuation coefficient of composition, the number-average particle size, and the fluctuation coefficient of particle size thereof. The data are given in Table 1.

In Table 1, the composition of each sample was analyzed as follows: The dispersion was evaporated to dryness, then the organic matter was decomposed with concentrated sulfuric acid, and the residue was dissolved in aqua regia and subjected to ICP spectrometry (inductively-coupled plasma emission spectrometry).

The particle size (number-average particle size) and the fluctuation coefficient of particle size were calculated as follows: The sample was photographed with TEM (Nippon Denshi's 1200EX), and its picture was analyzed with a particle sizer (Carl Zeiss' KS-300), and the data were statistically processed.

The fluctuation coefficient of composition was calculated as follows: The sample was analyzed with a device FE-TEM/EDS (Hitachi's HF-2210), in which about 20 metal nano-particles were analyzed for the composition thereof.

<Determination of Coercive Force in Magnetic Recording Media>

The dispersion of nano-particles prepared in Examples 1 to 7 and Comparative Examples 1 to 4 was applied onto a polished glass substrate in a mode of spin coating to fabricate magnetic recording media. The coating amount was 0.1 g/m$^2$.

The coated samples were annealed in a mixed gas of Ar+H$_2$ (5%) at 475° C. or 375° C. in an IR heating furnace (Alback Riko's QH-P610C?) to thereby form a magnetic layer on the substrate.

After the annealing, carbon was sputtered on the surface of the magnetic layer to a thickness of 10 nm, in a sputtering device (from Shibaura Mechatronics). Next, a lubricant (Ausimont's FOMBLIN) was applied onto it in a mode of spin coating to a thickness of about 5 nm to fabricate magnetic recording media.

The coercive force of the magnetic recording media fabricated in the above was measured as follows: Toei Kogyo's high-sensitivity magnetization vector-measuring device and data process or were used, and the sample was analyzed in a magnetic field of 790 kA/m (10 kOe). The data are given in Table 1.

As in Table 1, the fluctuation coefficient of particle size and the fluctuation coefficient of composition of the alloy nano-particles of Examples 1 to 7 were both at most 9% and were small, and the nano-particles had a monodispersed uniform composition. As opposed to these, the fluctuation coefficient of particle size and the fluctuation coefficient of composition of the alloy nano-particles of Comparative Examples 1 to 3 were at least 26% and were large, and the nano-particles had a non-uniform composition. The fluctuation coefficient of particle size of the alloy nano-particles of Comparative Example 4 was not larger than 20% (13%), but the fluctuation coefficient of composition thereof was over 20% (28%). This means that the nano-particles had a non-uniform composition.

The magnetic recording media fabricated by the use of the alloy nano-particles of Examples 1 to 7 were hard-magnetic, having a coercive force of larger than 238.7 kA/m (3000 Oe), annealed at 475° C. Even when annealed at 375° C., the magnetic recording media with the alloy nano-particles of Examples 2 to 7 were hard-magnetic, having a coercive force of larger than 238.7 kA/m (3000 Oe). In addition, n the magnetic recording media with the alloy nano-particles of Examples 1 to 7, the alloy nano-particles in the magnetic layer fused little, and they kept almost the original particle size before annealing. As opposed to these, the magnetic recording media with the alloy nano-particles of Comparative Examples 1 to 4 all had a small coercive force and were not hard-magnetic, even after annealed at 375° C. or higher.

The above results confirm that the magnetic recording media with the alloy nano-particles of the invention have high coercive force and have a flat magnetic layer where the nano-particles aggregate little.

As described hereinabove, the alloy nano-particles of the invention may form a flat magnetic layer which has a high coercive force and a low transformation point and in which the alloy nano-particles hardly aggregate.

The present disclosure relates to the subject matter contained in Japanese Patent Application No. 181205/2003 filed on Jun. 25, 2003, which is expressly incorporated herein by reference in its entirety.

The foregoing description of preferred embodiments of the invention has been presented for purposes of illustration

TABLE 1

| | Metal Composition of Nano-particles | Metal Composition Ratio of Nano-particles (atomic %) | Fluctuation Coefficient of Composition (%) | Number-Average Particle Size (nm) | Fluctuation Coefficient of Particle Size (%) | Coercive Force after annealed at 475° C. (kA/m) | Coercive Force after annealed at 375° C. (kA/m) |
|---|---|---|---|---|---|---|---|
| Example 1 | Fe/Pt | 52/48 | 5 | 4.8 | 6 | 278.5 | 63.7 |
| Example 2 | Fe/Cu/Pt | 40/20/40 | 6 | 5.1 | 7 | 429.7 | 358.1 |
| Example 3 | Fe/In/Pt | 42/16/42 | 9 | 5.5 | 8 | 397.9 | 326.3 |
| Example 4 | Fe/Pb/Pt | 40/19/41 | 6 | 5.4 | 6 | 389.9 | 294.4 |
| Example 5 | Co/Bi/Pt | 39/19/42 | 8 | 5.0 | 7 | 401.9 | 334.2 |
| Example 6 | Fe/Co/Cu/Pt | 20/22/17/41 | 5 | 5.2 | 6 | 405.8 | 318.2 |
| Example 7 | Fe/Co/In/Pt | 22/20/18/40 | 7 | 5.5 | 6 | 417.8 | 302.4 |
| Comparative Example 1 | Fe/Pt | 75/25 | 46 | 4.1 | 31 | 62.1 | 4.0 |
| Comparative Example 2 | Fe/Pt | 51/49 | 30 | 5.0 | 35 | 79.6 | 6.4 |
| Comparative Example 3 | Fe/Pt | 57/43 | 29 | 4.9 | 26 | 95.5 | 5.6 |
| Comparative Example 4 | Fe/Pt | 51/49 | 28 | 4.6 | 13 | 87.5 | 7.2 | and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. Alloy nano-particles having a fluctuation coefficient of particle size of 20% or less and a fluctuation coefficient of composition of 20% or less, which contain at least two metals selected from Group VIII of the short-form Periodic Table and at least one metal selected from Group I, Group III, Group IV and Group V of the short-form Periodic Table,
   wherein at least one metal selected from Group I, Group III, Group IV and Group V of the short-form Periodic Table is selected from the group consisting of Cu, Ag, B, In, Sn, Pb, P, Sb and Bi.

2. Alloy nano-particles of claim 1, which has a fluctuation coefficient of particle size of 10% or less and a fluctuation coefficient of composition of 10% or less.

3. Alloy nano-particles of claim 1, wherein at least two metals selected from Group VIII of the short-form Periodic Table are selected from the group consisting of FePt, FePd, FeNi, FeRh, CoNi, CoPt, CoPd, CoRh, FeNiPt, FeCoPt, CoNiPt, FeCoPd and FeNiPd.

4. Alloy nano-particles of claim 1, wherein the alloy is FePtCu, FePtIn, FePtPb, FePtBi, FePtAg, CoPtCu, FePdCu, FeCoPtCu, FeNiPtCu, FePtCuAg or FeNiPdCu.

5. Alloy nano-particles of claim 1, wherein the content of at least one metal selected from Group I, Group III, Group IV and Group V is from 0 to 35 atomic % of the alloy nano-particles.

6. Alloy nano-particles of claim 1, wherein the content of at least one metal selected from Group I, Group III, Group IV and Group V is from 15 to 30 atomic % of the alloy nano-particles.

7. Alloy nano-particles of claim 1, wherein the alloy is CuAu-type.

8. Alloy nano-particles of claim 1, wherein the alloy is $Cu_3Au$-type.

9. Alloy nano-particles of claim 1, which have a coercive force of from 110 to 1200 kA/m.

10. Alloy nano-particles of claim 1, which have a transformation point lower than 550° C.

11. A magnetic recording media containing alloy nano-particles of claim 1.

* * * * *